United States Patent

[11] 3,577,669

| [72] | Inventor | Joseph A. Johnson<br>12272 W. Mississippi Ave., Colo. 80228<br>Ray Key<br>4858 Meade, Denver, Colo. 80221 |
|---|---|---|
| [21] | Appl. No. | 835,519 |
| [22] | Filed | June 23, 1969 |
| [45] | Patented | May 4, 1971 |

[54] FISHING BOBBER
4 Claims, 7 Drawing Figs.

[52] U.S. Cl. .................................................. 43/43.11, 43/44.88, 43/44.91
[51] Int. Cl. ........................................................ A01k 93/00
[50] Field of Search .......................................... 43/43.11, 44.88, 44.91, 44.92, 44.95

[56] References Cited
UNITED STATES PATENTS

| 2,678,511 | 5/1954 | Wright .......................... | 43/43.11 |
| 3,168,790 | 2/1965 | Creasey ........................ | 43/43.11 |

*Primary Examiner*—Warner H. Camp
*Attorney*—Sheridan, Ross & Burton

ABSTRACT: Fishing bobber of the type having a coiled supply of drop line with a terminal sinker adapted to descend after the bobber is delivered to a desired target point on the water, characterized by an inclined surface on the bobber which maintains the sinker attached to same until the bobber strikes the water, the buoyancy and attitude at which time permits a securing loop of drop line to slide off of the inclined surface; further characterized by a manually operable line clutch for adjusting the length of the drop line, the clutch also adapted to slip relative to the line during retrieval of a fish when the bobber engages the end of a fishing rod to thereby permit the drop line to be reeled in for landing the fish.

PATENTED MAY 4 1971
3,577,669
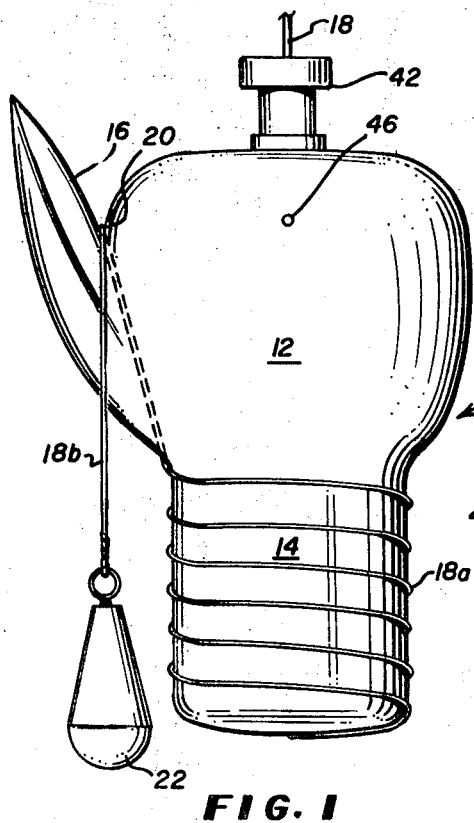
FIG. I
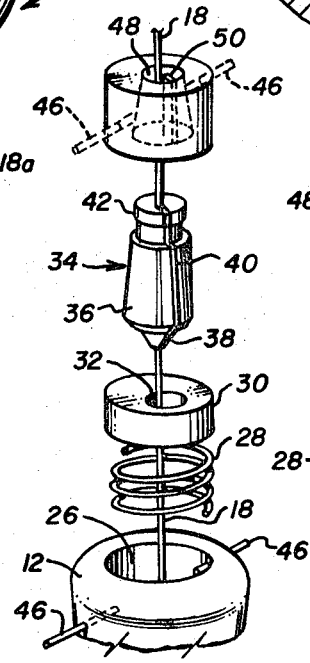
FIG. 3
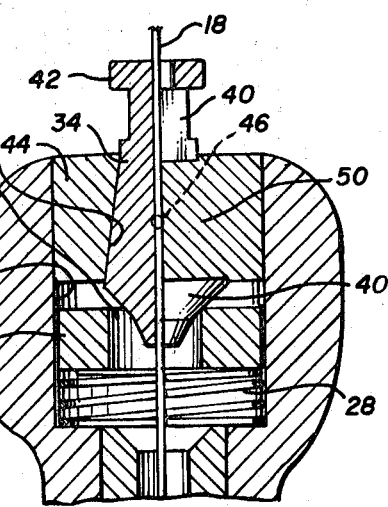
FIG. 2
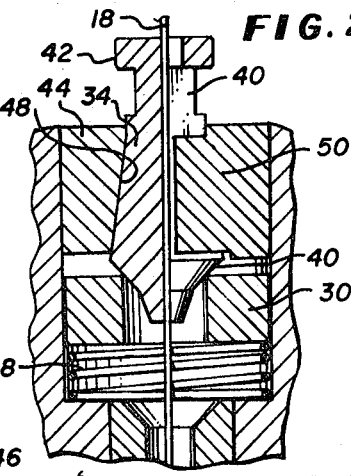
FIG. 2a
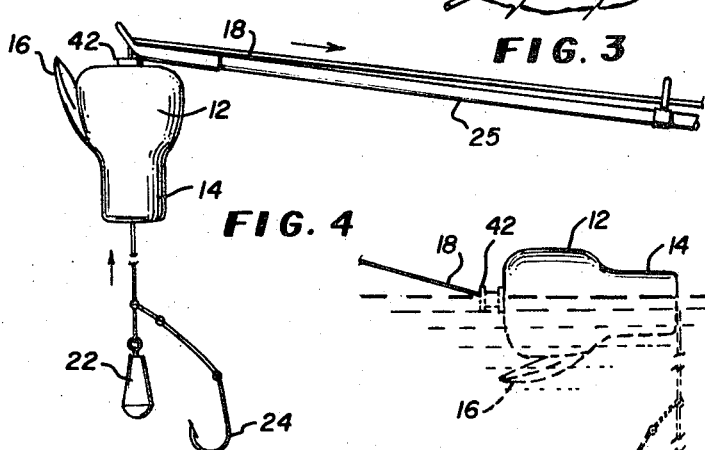
FIG. 4
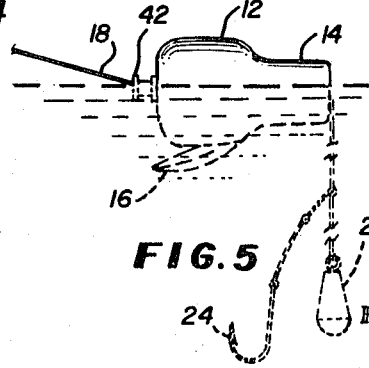
FIG. 5
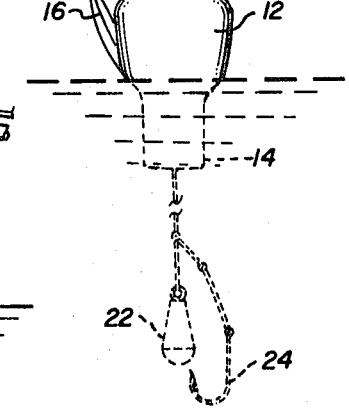
FIG. 6
INVENTORS
Ray Key
Joseph A. Johnson
BY Sheridan, Ross & Burton
ATTORNEYS

FISHING BOBBER

BACKGROUND OF THE INVENTION

In the art of fishing with rod and reel it has long been a practice to secure a small float or bobber to the fishing line at some point along its length, the line beyond the bobber forming a dropline having a lure or bait which descends to a desired depth. As will be apparent, if the bobber is cast some distance with a rod and reel the dropline will be in a generally vertical position whereas the line between the bobber and fishing rod will be in a generally horizontal position. The latter is generally maintained without slack so that when a fish strikes the bait this may either be felt by the fisherman or the change of attitude of the bobber may be observed so that the line may be tightened to set the hook. If the length of the dropline is considerable this presents a casting problem since on the back cast the dropline may entangle with objects such as trees, brush or the like. In general, the length of the dropline should be shorter than the length of the rod, and where entangling obstructions are near the rod tip during the cast, it is preferable to maintain this length as short as possible. Various bobbers have been devised for this purpose, exemplary of which is a bobber disclosed by the U.S. Pat. to Stephens et al., No. 2,888,771 in which a dropline with a sinker is coiled within the bobber and unreels from same after a water soluble material permits release of the sinker. Of further interest, this patent also discloses a line clutch. As will subsequently appear in detail, the present invention includes a simplified manner of dropline release and also a line clutch, the operation of which provides improved control over initial positioning of the bobber on the line and also its capacity to slip relative to the line during retrieval of a fish.

SUMMARY OF THE INVENTION

The present invention is characterized by several features which include: (1) a bobber having distribution of buoyancy such that when it strikes the water its longitudinal axis will lie parallel with the water surface, the bobber being rotatable about such axis, (2) an inclined surface on the bobber which retains a dropline and sinker attached to the bobber during the cast but permits release of the dropline when it strikes the water, irrespective of the rotational position of such inclined surface, the torque on the bobber, produced by the sinker, rotating such surface to a downwardly inclined position wherein a securing loop of the dropline may freely slide off of such surface and permit the dropline and sinker to immediately descent to their intended positions, and (3) a line clutch which may be manually operated to lock the bobber to the line at a position wherein a desired length of dropline may be stored for release upon delivery of the bobber to the water, the clutch also being operable to permit sliding of the dropline through the bobber when the line is retrieved to the point where the bobber abuts the end or tip of the fishing rod.

The principal objects of the invention thus include the features aforesaid. Further objects, advantages and salient features will become more apparent from the detailed description to follow, the appended claims and the accompanying drawing now to be briefly described.

BRIEF DESCRIPTION OF THE DRAWING

FIG. 1 is a side elevation of a bobber comprising the subject of the invention;

FIG. 2 is a longitudinal central section through the upper portion of FIG. 1;

FIG. 2a is a like section illustrating another position of parts;

FIG. 3 is an exploded view of parts shown in FIG. 1;

FIG. 4 illustrates a position of parts during retrieval of a fish;

FIG. 5 illustrates the normal position of repose of the bobber on the surface of a body of water and without a downward force applied to a dropline; and FIG. 6 illustrates an erect position of the bobber with a sinker resting on the floor of the body of water with a downward force applied to the dropline.

DESCRIPTION OF THE PREFERRED EMBODIMENTS

Referring now to the drawing, and first to FIG 1, the subject of the invention comprises, in general, a bobber 10 having an enlarged or bulbous portion 12, a cylindrical line storage portion 14 and a lateral projection 16 secured to the bulbous portion. In the position of parts as shown, it may be assumed that a fishing rod is in a position ready for a cast, such as in a rearwardly inclined position, fishing line 18 is in a vertical position with the bobber close to the pole tip guide, a suitable amount of dropline 18a has been coiled around portion 14 and another portion 18b has been looped into crotch 20, its terminal end being connected to a sinker 22. When propelled forwardly by the forward cast the sinker and loop remain in the position shown until striking the surface of the water whereupon loop 18b falls from crotch 20, uncoiling portion 18a and permitting the sinker to descend to a desired depth which generally will be to the bottom of a body of water, such as a lake.

FIG. 5 illustrates one possible position of the bobber when it strikes the water with projection 16 disposed in a downwardly inclined position. In this position, loop 18b slides away from crotch 20 and along the now downwardly inclined surface of projection 16 allowing the sinker to descend, and uncoiling dropline 18a as the bobber rotates about its longitudinal axis. In the event projection 16 is disposed in any position other than shown in FIG. 5 when the bobber strikes the water, loop 18b and the sinker exert a torque about the longitudinal axis of the bobber, rotating it to the position shown, whereupon the sinker uncoils the dropline in the same manner, first described.

The depth of the sinker may readily be ascertained by the position or attitude of the bobber. Assuming that the sinker is of sufficient weight to overcome the buoyancy of the bobber, the bobber will be completely submerged if the sinker is spaced above the bottom of the water. In the event the sinker is on the bottom and slackline exists between it and the bobber, the bobber remains in he position shown in FIG. 5 which is its normal position of repose with no downward force applied to the free end of portion 14. In the event the sinker is on the bottom and there is no slackline, the bobber is tilted to the erect position as shown in FIG. 6. It will now be apparent that by observing the position of the bobber, the length of dropline 18a may be adjusted so that the sinker lies on the bottom and without slack in the dropline which is usually desirable to enable the fisherman to set the hook immediately upon feeling the fish strike a lure, such as bait attached to hook 24, which as will be apparent, may be attached at any point to dropline 18a.

In the most simple form of the invention, as so far described, line 18 may pass through an axial aperture in the bobber and be tied to its upper end with a knot so that the length of the dropline may be adjusted as desired. Preferably, however, a clutch is provided which serves a two-fold purpose; first, to eliminate the knot just referred to and permit clutching the bobber to the line by manual operation of the clutch, and second, to permit the clutch to slip when retrieving a fish. As to the latter, it is to be noted that when the line is retrieved to the point where the bobber strikes the fishing rod, the fish is still at a distance from same equal to the length of the dropline which may be considerable. It is, of course, desirable to reduce this distance so that the fish may be lifted from the water, netted, gaffed or otherwise captured depending upon the method of capture employed.

Referring now to FIGS. 2 and 3, portion 12 of the bobber is provided with a bore 26 which contains a spring 28, a washer 30 urged by same and having an eccentric aperture 32 extending between its opposite faces. A release plunge 34 having a frustoconical surface 36 is disposed adjacent the washer, the plunger also having a conical end 38 which cooperates with aperture 32 is a manner to be subsequently set forth. A longitudinal slot or groove 40 extends from the outer surface of the plunger to its axis, the line normally lying in the bottom of the slot. The upper end of the plunger is provided with a ring or collar 42 which confines the line in the slot at this point. A plug 44 closes the outer end of bore 26 and is affixed to the bobber in any suitable manner, such as by a pair of diametrically opposed pins 46,46. The plug is provided with a frustoconical bore 48 which corresponds to the plunger and carries a wedge 50 which slides in slot 40. When in the locked or clutched position with the line, spring 28 urges washer 30 which in turn urges plunger 34 axially of the bore of plug 44 moving wedge 50 radially inwardly against the line, securing same against axial movement in the bobber. Upon manual depression of the plunger, the wedge is released from engagement with the line to permit the bobber to be slid along the line to a desired position to adjust the length of dropline 18a. Aperture 32 is preferably eccentric so that when conical end 38 is forced into same the plunger tilts slightly, as indicated in FIG. 2a, providing a positive release between the wedge and the line. In the operation of the clutch during retrieval of the fish the bobber will eventually abut the pole tip at which point the fish is still at a distance equal to the length of the dropline. When this occurs, continued retrieval of the line permits the dropline to slip relative to the wedge and slide through the plunger until the fish is retrieved to a position close enough for final capture.

We claim:
1. Fishing apparatus comprising:
   a. a bobber having a bulbous upper portion and a cylindrical lower portion about which a supply of dropline may be coiled,
   b. the buoyancy of the bobber being such that a central longitudinal axis passing through said portions lies substantially parallel to the surface of a body of water in the absence of a downward force applied to the free end of said cylindrical portion, a downward force on said free end adapted to erect the bobber with its longitudinal axis disposed vertically,
   c. means for securing the bobber to a fishing line intermediate its ends to thereby provide a desired supply of dropline and to which a sinker may be affixed,
   d. a lateral projection on said bulbous portion forming a notch adapted to receive a terminal loop of the dropline and retain the sinker adjacent the bobber during a cast and until the bobber strikes the water,
   e. the surface of said projection adapted to assume a downwardly inclined position when the bobber is disposed on the water with its longitudinal axis lying substantially parallel with the water, to thereby permit said loop to slide off same, permitting the sinker to descend, and uncoil said supply,
   f. said means for securing the bobber to a fishing line comprising a clutch adapted to engage the line at a desired position therealong, and manual means for releasing the clutch, whereby the bobber may be slid along the line to a position to provide a desired supply of dropline,
   g. said clutch comprising a plunger having an exposed portion for manually depressing same, the plunger having a conical surface slidable axially relative to a corresponding conical surface in the bobber, a wedge secured to the last-named conical surface extending radially inwardly and slidable in a longitudinal slot in the plunger and through which the line extends, and a spring for urging the wedge into contact with the line.

2. Apparatus in accordance with claim 1 including a conical surface on an end of the plunger engageable with an eccentric aperture in a washer adapted to be urged by the spring, the construction being such that when the plunger cams into the eccentric aperture it is laterally tilted to positively disengage the wedge from the line.

3. Apparatus in accordance with claim 2 wherein the bobber is adapted to engage the tip end of a fishing rod during retrieval of a fish and permit the clutch to slip whereby the dropline may be reeled through the bobber to a position wherein a fish may readily be captured.

4. Fishing apparatus comprising:
   a. a bobber having a cylindrical lower portion about which a supply of dropline may be coiled, the terminal end of the supply adapted to be affixed to a sinker,
   b. means for retaining the sinker adjacent the bobber during a cast and until the bobber strikes the water and for thereafter permitting the sinker to descend and uncoil the supply,
   c. a spring-urged clutch carried by the bobber adapted to engage the line at a desired position therealong, and
   d. means for releasing the clutch, whereby the bobber may slide relative to the line,
   e. said clutch including a spring urged axially movable plunger with a longitudinal slot in same in which the line is disposed, and a wedge carried by the bobber extending into the slot and into engagement with the line, the construction being such that upon relative axially movement of the plunger and wedge, the clutch may be disengaged from the line.